April 19, 1932.  W. B. JONES  1,855,152
SELECTIVE CONTROL DEVICE
Filed Jan. 7, 1931   2 Sheets-Sheet 1

Witness:
Chas. P. Koursh

Inventor,
W. Bartlett Jones,
By M. F. Cargill Atty.

April 19, 1932.  W. B. JONES  1,855,152
SELECTIVE CONTROL DEVICE
Filed Jan. 7, 1931   2 Sheets-Sheet 2
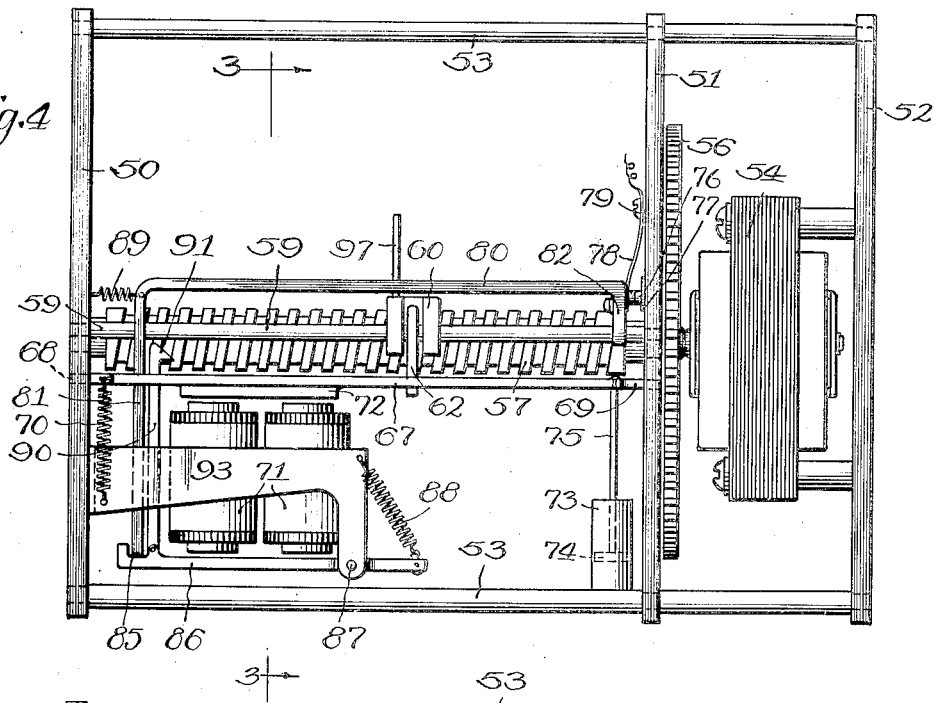
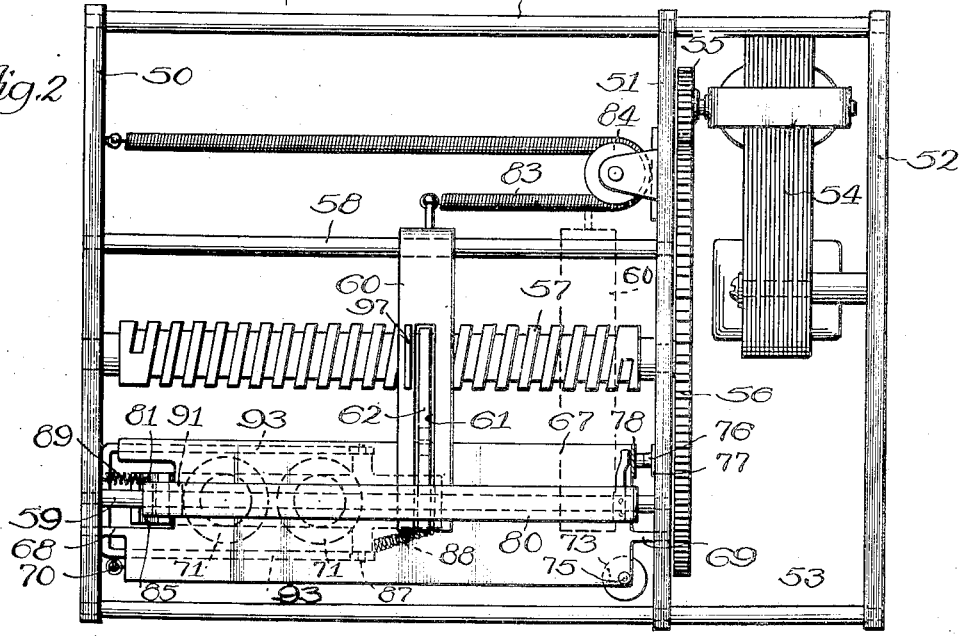

Patented Apr. 19, 1932

1,855,152

UNITED STATES PATENT OFFICE

W. BARTLETT JONES, OF CHICAGO, ILLINOIS

SELECTIVE CONTROL DEVICE

Application filed January 7, 1931. Serial No. 507,150.

The present invention relates to electrical apparatus in the nature of a control device. It has particular reference to a device which may be placed in an electrical circuit at one place, so that a control of the device may be effected by controlling the supply of power, as through a switch in the circuit. In one respect the device may be termed a finder, or a selector inasmuch as it may be stopped at any point short of a complete uncontrolled and automatic operation after an initiating control. The invention provides a device in which there is a movable element which moves, preferably slowly, from a starting or idle position as soon as power is connected to the device. The motion may continue until a fixed path has been travelled. Various operations may be performed by the moving element.

In addition the invention provides a device such that the movable element may be stopped at any point in its path. In other words the path travelled may be shortened by the will of the operator. This may be effected during the travelling period by a momentary releasing action preferably effected by opening a circuit to the device, or a certain control circuit therein.

Whenever the movable element is stopped it maintains its position of arrest until the control is operated or the circuit is again opened, when it returns to its initial position for a repetition of the operation.

Although the device may be used to perform numerous mechanical tasks, it is preferably employed in a circuit which is controlled from a remote location by a switch. The device so used may be made to control numerous other circuits likewise under the control of said switch. In my copending application Serial No. 179,528, filed March 30, 1927, I have disclosed a device capable of performing substantially the same functions as the device of the present invention. That device has been particularly described as a control mechanism which may be placed in an electrolier which is supplied by power from but two wires, controlled by a switch, as in a wall for lighting a room. The control device may be used to select one or more lights, and to light them in succession, and to stop the lighting at the point where only a certain few of them are desired. The present invention is in effect an improvement over and a simplified development of the device of the copending application. It is herein described with reference to the same usage, but other uses will be pointed out.

One object of the invention is the provision of a controllable device having an element capable of moving over a given path and of stopping automatically, and responsive to a timed control, to stop anywhere in its path or to return to initial position.

Another object of the invention is the provision of a control device which may be placed in an electric circuit and controlled from a remote place by a single switch in the circuit.

Another object is the provision of a device having a movable element which starts to travel over a given path as soon as power is applied, which may be halted and arrested in any position in its path by a momentary break in a circuit, which stops automatically, and which returns automatically to its initial starting position when the power is interrupted for a period greater than the limited momentary period for halting the element.

Various other and ancillary objects and advantages of the invention will appear from the following description and explanation of the invention and the device illustrated in the drawings, in which:

Fig. 2 is a plan view of a mechanical embodiment of the invention.

Fig. 4 is a front elevation of the portion of the device shown in Fig. 3.

Figure 3:
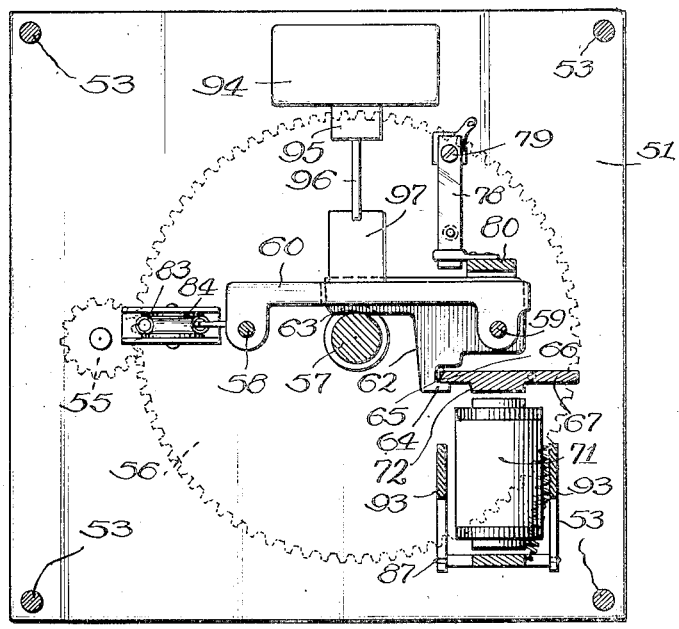
Fig. 3 is a cross-section of a portion of the device along line 3—3 of Fig. 2 and Fig. 4.

In the drawings the invention is represented more or less graphically and diagrammatically as it may be used in one circuit to control sub-circuits, or as it may be used in an electrolier fed by two wires to make a selective control over individual lamps of the electrolier by manipulation of the wall switch.

Figure 1:
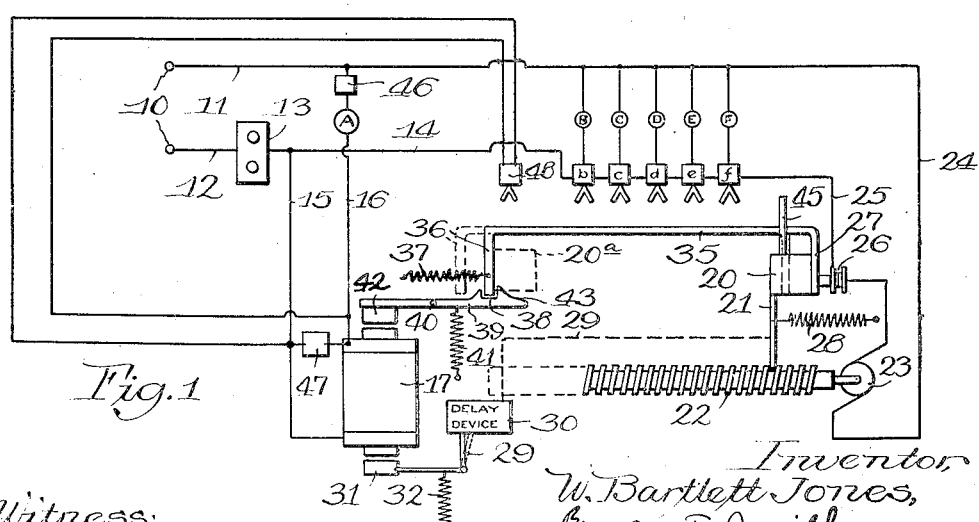
Fig. 1 is a diagrammatic representation of the device showing its electrical connections and its relation to a series of switches as in an electrolier to operate said switches.

Referring to Fig. 1, 10 is a source of power from which wire 11 leads to series of lamps A, P C, D, E, and F, as in an electrolier. Wire 12 has a wall switch 13 represented therein. From the switch wire 14 leads to one side of switches b, c, d, e, and f, controlling the series of lamps B to F respectively. Lamp A is considered to be in a control circuit. From wire 14 and from lamp A, respectively lead two wires 15 and 16 which connect to a solenoid or electromagnet 17 forming part of the device. The energization and deenergization of the electromagnet effects certain controls in the device.

The numeral 20 represents the movable element in its initial or idle position, that is the position which it occupies when it is responsive for operation and when no power is supplied. It has a lug represented by the part designated 21. The lug 21 enters the meshes of a worm 22 which is turned by a motor 23. Two wires 24 and 25 connect the motor to the line wires 11 and 14. A switch 26 is placed in the motor line 25, and in the beginning is kept closed by an arm 27 pressed by the movable element 20 under the influence of a spring 28. This spring is the means for storing power to return the element to initial position whenever the element is released for such motion. The release is effected by moving the lug 21 out of the meshes of the worm 22. The engaged lug is therefore a sort of braking device for automatic motion of the element. Release is brought about by means indicated by line 29, associated with a delaying device 30, and with an armature 31, releasably drawn by the electromagnet 17 against a spring 32.

Upon breaking the current in the solenoid or electromagnet the tendency is to move the lug 21 out of mesh. However, the movement is slow because of retarding action of the delay device 30. A momentary break in the solenoid current gives insufficient time to permit withdrawal of the lug, and the spring 28 does not draw the element to initial position.

Motion from the motor causes worm 22 to move the element toward its end position 20ª.

As it leaves the arm 27 the arm is still pressed against the switch 26 to close it by reason of the arm 27 being carried on a rod 35, having a similar arm 36 on the other end. The rod 35 is movable lengthwise and is urged in a direction to open switch 26 by a tension spring 37 attached to the rod. The arm 36 is not free to move as its end lies in a notch 38 in a detent lever 39 pivoted at 40. A spring 41 tends to swing the lever to free the arm 36 from the notch, but an armature 42 on the lever is pulled by the solenoid 17 to prevent disengagement of the arm, thus holding the motor switch 26 closed. As the element 20 approaches the position 20ª it rides on cam surface 43 formed on the detent 39, causing it to move away and free the arm 36. This causes motor switch 26 to open and the motor stops. Hence the element 20 comes to rest.

At any time during the travel of the element a momentary break in the current of the solenoid causes the detent to release the arm 36 and hence to stop the motor. When the current break is but momentary the lug 21 remains in mesh and the element is locked against return. If the current break is prolonged the lug will go out of mesh and the element returns to starting position, closing the motor switch 26 again for the next operation. Attached to the element is a post 45 which moves past the row of switches lettered b to f to operate them in each direction of travel. Other operations may be performed in a like manner.

The device may be constructed to operate a rheostat to dim or brighten lights as well as to operate switches. It may be used to effect station selecting as in tuning a radio. The speed may of course be regulated by properly choosing or gearing the motor. The delay device may be timed to suit the particular use for which the invention is embodied in a device.

Control may be effected by the switch 13 which also controls the subcircuits of lights B, C, D, E, and F, and the motor 23. Control may also be effected from an auxiliary switch 46 in series with the electromagnet 17 or by an auxiliary switch 47 across the electromagnet to short circuit it where the magnet is in series with a light A. By the three switches shown three places of control may be provided as for example the switch 13 in the wall, the switch 46 which may be associated with control lamp A in the form of a table drop light, and the switch 47 which may be attached to or run from the electrolier to any location.

A movable switch 48 may be placed anywhere in the path of the element 20 momentarily to short circuit the electromagnet 17 at any place in its travel. Such a switch will stop the element automatically before it cams the detent open.

Various mechanical embodiments of the device may be made, one of which is shown in the remainder of the drawings. Three main frame plates 50, 51 and 52 are shown connected by suitable tie rods 53. Between plates 51 and 52 there is a motor 54 with a pinion 55 meshing with gear 56. Gear 56 is rigid with a coaxial worm 57 parallel to which run two guide rods 58 and 59 bearing a movable runner 60. The runner is slotted from one end at 61 and a leaf plate 62 is mounted therein about guide rod 59 as a pivot. The plate has an edge 63 engaging the meshes of worm 57. A hook 64 in the plate forms a recess 65 into which enters the edge 66 of the tilting plate 67 pivoted in the frame plates at 68 and 69. The tilting of the plate controls the meshing with the worm.

A spring 70 tends normally to tilt the plate to disengage the plate 62 from the worm, but this is opposed by the attractive force of a solenoid or electromagnet 71 acting on an armature 72 carried by the plate. A delay device is provided by a bleeding dashpot 73 of which a loose piston 74 is carried by the plate 67 by means of a link 75.

On the plate 51 there is a switch for the motor comprising a contact 76 insulated at 77 from the plate and a leaf spring contact arm 78 insulated at 79 from the plate. The spring arm 78 tends normally to open the switch. The end of a slide bar 80 presses the contact arm 78 to close the switch. The slide bar has arms 81 and 82 which are perforated to receive and slide on the guide rod 59, and it is prevented from turning by being flat and resting substantially on the runner 60. The runner 60 has a spring 83 passing over a pulley 84 which spring tends to return the runner to a position near the motor (Fig. 2). In this position the runner presses against arm 82 and forces closure of the motor switch. The arm 81 at the other end extends downward (Fig. 4) where it is caught in a notch 85 of a detent 86 pivoted at 87. The detent is electromagnet and is raised into holding position by the lower poles of the magnets 71, against a spring 88. Upon deenergization of the magnets the spring trips the detent and permits a spring 89 to draw slide bar 80 in a direction to open the motor switch.

A link 90 is carried by the detent and arranged lengthwise and slidably alongside the arm 81. At its top there is a cam surface 91 in the path of the runner 60 so that when the runner approaches the end of the worm it rides on cam 91 and forces the detent 86 to release the arm 81 against the holding force of the magnets.

The electromagnets 71 are carried by a bracket arm 93 which extends downwardly to support the pivot 87 of the detent.

The device may have associated with it a unit of operable devices, represented in Fig. 3 by a box 94 containing spaced switches 95 having arms 96 in the path of motion of an operating finger 97 which is rigid with the runner. Electrical connections of the device may be made according to the arrangement described in reference to Fig. 1.

Figure 5:
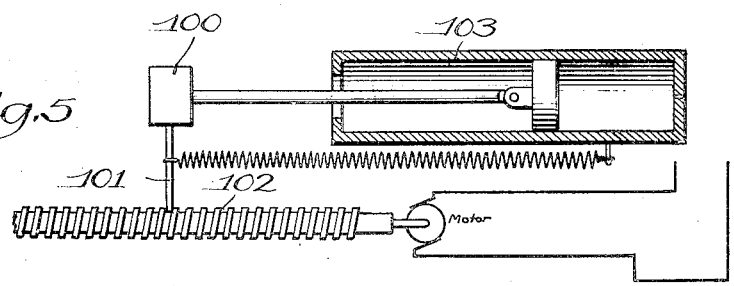
Fig. 5 is a diagrammatic view of a modified portion of the structure.

Another modification may be made which will vary the usefulness of the device. This is shown diagrammatically in Fig. 5. The part designated 100 represents the moving element having the lug 101 entering the worm 102. The structure may be the same as above described in all respects except that the bleeding dash pot is transferred to a position where it will retard the return of the element. This is indicated by the numeral 103. There is thus no need for one of the two releasable members to be more slowly releasable, because the retarding of the returning element is sufficient to retain the element in nearly the same position where its motion becomes arrested. The design may be accordingly modified to make one armature perform the function of both releasable elements.

While I have described the device with reference to electrical operations and control it is to be understood that the combination of parts is susceptible to modification, particularly in one or more of its elements, and mechanical rather than electrical parts may be substituted. For example the electric switch controlling the supply of power to the motor may be a power clutch; the solenoid may be a mechanical holder operated manually by some mechanical connection. In the accompanying claims I aim to use terms broad enough in character to cover such equivalents in one or more of the parts and other modifications. The invention therefore is not to be considered as limited to and by the disclosure, but to have a scope commensurate with the appended claims.

I claim:

1. A control device comprising in combination an element movable over a given path, power storing means tending normally to return said element to an initial position in its path, an electric motor, a gear driven by said motor, toothed means carried by said element engageable with said gear whereby motion of the gear moves said element from said initial position, means tending normally to move said toothed means to disengage the element and the gear, a solenoid associated with said last mentioned means arranged to prevent disengagement of the gear and element during energization of the solenoid, delay means to retard the motion or release from said solenoid, a motor switch, means to close said switch operable by the element in idle position, an electromagnetically held detent arranged to hold said means against opening the motor switch when the element is in its path of travel, and means positioned in the path of said element associated with said detent and arranged to move said detent against the electromagnetic force.

2. A control device comprising in combination an element movable over a given path, power storing means tending normally to return said element to an initial position in its path, an electric motor, a gear driven by said motor, toothed means carried by said element engageable with said gear whereby motion of the gear moves said element from said initial position, means tending normally to move said toothed means to disengage the element and the gear, a solenoid associated with said last mentioned means arranged to prevent disengagement of the gear and element during energization of the solenoid, delay means to retard the motion or release from said solenoid, a motor switch, means to close said switch operable by the element in idle position, an electromagnetically held detent arranged to hold said means against opening the motor switch when the element is in its path of travel, and means arranged in the path of said element for releasing said detent from holding position.

3. A control device comprising in combination a motor, a motor switch, gearing operated by the motor, a travelling element moved by the gearing from an initial position, a spring resisting the travel of said element, a meshing lug connecting said element with said gearing, an electromagnet, an electromagnetically held means holding said lug in mesh with the gearing, means to delay the action on release of said electromagnetically held means, a resiliently movable member for closing the motor switch tending normally to open said switch, said member being moved to close the switch by action of the spring on said element in its initial position, an electromagnetically held detent to hold said member against opening the motor switch, and means in the path of said moving element adapted for operation thereby to release the detent to permit said member to open the motor switch.

4. A control device comprising in combination a resiliently movable element, power means to move said element, a power connection between said means and said element, a solenoid, means held by said solenoid arranged when held to control said power connection for transmitting power to said element, delay mechanism to retard the control of said power connection on release from said solenoid, and more quickly responsive mechanism also held for release by said solenoid for stopping operation of said power means upon release.

5. A control device comprising in combination a resiliently movable element having an initial position, driving means to move said element, a disengageable power connection between said means and said element, an electromagnetic holder, quickly releasable means arranged to be held and released by said holder for cutting off the supply of power to said driving means upon release, and more slowly releasable means arranged to be held and released by said holder for disengaging said power connection upon release, said element in its initial position being arranged to establish a supply of power to said driving means.

6. A control device comprising in combination a resiliently movable element having an initial position, driving means to move said element, a disengageable power connection between said means and said element, a manually controlled holder, quickly releasable means arranged to be held and released by said holder for cutting off the supply of power to said driving means upon release, and more slowly releasable means arranged to be held and released by said holder for disengaging said power connection upon release, said element in its initial position being arranged to establish a supply of power to said driving means.

7. A control device comprising in combination a resiliently movable element having an initial position, electrically operated driving means to move said element, a power switch for said means, a disengageable power connection between said means and said element, an electromagnetic holder, quickly releasable means arranged to be held and released by said holder for opening said power switch upon release, and more slowly releasable means arranged to be held and released by said holder for disengaging said power connection upon release, said element in its initial position being arranged to close said power switch.

8. A control device comprising in combination a resiliently movable element having an initial position, electrically operated driving means to move said element, a power switch for said means, a disengageable power connection between said means and said element, a manually controlled holder, quickly releasable means arranged to be held and released by said holder for opening said power switch upon release, and more slowly releasable means arranged to be held and released by said holder for disengaging said power connection upon release, said element in its initial position being arranged to close said power switch.

9. A control device comprising in combination a resiliently movable element having an initial position, power storing returning means arranged to return said element to initial position, driving means to move said element against said returning means, a brake mechanism arranged to hold said element against return movement, a holder, quickly releasable means arranged to be held and released by said holder for cutting off a supply of power to said driving means upon release, and more slowly releasable means arranged to be held and released by said holder for operating upon said brake mechanism to release the element to permit return of said element, said element in its initial position being arranged to establish a supply of power to said driving means.

10. A control device comprising in combination a resiliently movable element having an initial position, power storing returning means arranged to return said element to initial position, driving means to move said element against said returning means, a brake mechanism arranged to hold said element against return movement, a holder, quickly releasable means arranged to be held and released by said holder for cutting off a supply of power to said driving means upon release, means positioned in the path of said element in advance thereof to be actuated thereby to cut off the supply of power to said driving means, and more slowly releasable means arranged to be held and released by said holder for operating upon said brake mechanism to release the element to permit return of said element, said element in its initial position being arranged to establish a supply of power to said driving means.

11. A control device comprising in combination a resiliently movable element having an initial position, power storing returning means arranged to return said element to initial position, driving means to move said element against said returning means, a brake mechanism arranged to hold said element against return movement, a holder, quickly releasable means arranged to be held and released by said holder for cutting off a supply of power to said driving means upon release, means positioned in the path of said element in advance thereof to be actuated thereby to release said quickly releasable means from said holder whereby to cut off the supply of power to said driving means, and more slowly releasable means arranged to be held and released by said holder for operating upon said brake mechanism to release the element to permit return of said element, said element in its initial position being arranged to establish a supply of power to said driving means.

12. A control device comprising in combination a resiliently movable element having an intital position, electrically operated driving means to move said element, a power switch for said means, a disengageable power connection between said means and said element, a manually controlled holder, quickly releasable means arranged to be held and released by said holder for opening said switch upon release, means positioned in the path of said element in advance thereof to be actuated thereby to open said power switch, and more slowly releasable means arranged to be held and released by said holder for disengaging said power connection upon release, said element in its initial position being arranged to close said power switch.

13. A control device comprising in combination a resiliently movable element having an initial position, electrically operated driving means to move said element, a power switch for said means, a disengageable power connection between said means and said element, a manually controlled holder, quickly releasable means arranged to be held and released by said holder for opening said switch upon release, means positioned in the path of said element in advance thereof to be actuated thereby to release said quickly releasable means from said holder, whereby to open said power switch, and more slowly releasable means arranged to be held and released by said holder for disengaging said power connection upon release, said element in its initial position being arranged to close said power switch.

14. A control device comprising in combination a resiliently movable element having an initial position, electrically operated driving means to move said element, a power switch for said means, a disengageable power connection between said means and said element, an electromagnetic holder, quickly releasable means arranged to be held and released by said holder for opening said power switch upon release, means positioned in the path of said element in advance thereof to be actuated thereby to open said power switch, and more slowly releasable means arranged to be held and released by said holder for disengaging said power connection upon release, said element in its initial position being arranged to close said power switch.

15. A control device comprising in combination a resiliently movable element having an initial position, electrically operated driving means to move said element, a power switch for said means, a disengageable power connection between said means and said element, an electromagnetic holder, quickly releasable means arranged to be held and released by said holder for opening said power switch upon release, means positioned in the path of said element in advance thereof to be actuated thereby to release said quickly releasable means from said holder whereby to open said power switch, and more slowly releasable means arranged to be held and released by said holder for disengaging said power connection upon release, said element in its initial position being arranged to close said power switch.

16. A control device comprising in combination a resiliently movable element having an initial position, driving means to move said element, a disengageable power connection between said means and said element, a manually controlled holder, quickly releasable means arranged to be held and released by said holder for cutting off the supply of power to said driving means upon release, means positioned in the path of said element in advance thereof to be actuated thereby to cut off the supply of power to said driving means, and more slowly releasable means arranged to be held and released by said holder for disengaging said power connection upon release, said element in its initial position being arranged to establish a supply of power to said driving means.

17. A control device comprising in combination a resiliently movable element having an initial position, driving means to move said element, a disengageable power connection between said means and said element, a manually controlled holder, quickly releasable means arranged to be held and released by said holder for cutting off the supply of power to said driving means upon release, means positioned in the path of said element in advance thereof to be actuated thereby to release said quickly releasable means from said holder whereby to cut off the supply of power to said driving means, and more slowly releasable means arranged to be held and released by said holder for disengaging said power connection upon release, said element in its initial position being arranged to establish a supply of power to said driving means.

18. A control device comprising in combination a resiliently movable element having an initial position, driving means to move said element, a disengageable power connection between said means and said element, a manually controlled holder, means positioned in the path of said element in advance thereof to be actuated thereby to cut off said supply of power to said driving means whereby to stop motion of the element, and releasable means arranged to be held and released by said holder for disengaging said power connection upon release, said element in its initial position being arranged to establish a supply of power to said driving means.

19. A control device comprising in combination a resiliently movable element having an initial position, electrically operated driving means to move said element, a power switch for said means, a disengageable power connection between said means and said element, a manually controlled holder, means positioned in the path of said element in advance thereof to be actuated thereby to open said power switch, and releasable means arranged to be held and released by said holder for disengaging said power connection upon release, said element in its initial position being arranged to close said power switch.

20. A control device comprising in combination a moving element automatically returnable to an initial position, power means to move and hold said element against return, a controllable holder, a slowly releasable means held and released by said holder for disengaging said element from said power means upon release, a power control for said power means having an operable part thereof in the path of the advancing element to be actuated thereby to cut off power to said power means, having also a releasable part held and releasable by said holder for cutting off power to said power means, and having a part actuated by said element in initial position to establish a power connection to said power means.

In testimony whereof I have hereunto affixed my signature.

W. BARTLETT JONES.